(12) United States Patent
Engebretsen et al.

(10) Patent No.: US 12,539,080 B2
(45) Date of Patent: Feb. 3, 2026

(54) BIOFEEDBACK SYSTEM

(71) Applicants: NORWEGIAN UNIVERSITY OF SCIENCE AND TECHNOLOGY (NTNU), Trondheim (NO); NORDIC BRAIN TECH AS, Oslo (NO); ST. OLAVS HOSPITAL HF, Trondheim (NO)

(72) Inventors: Marcus Aleksander Engebretsen, Oslo (NO); Anker Stubberud, Ålesund (NO); Mattias Linde, Rönnäng (NO); Alexander Olsen, Trondheim (NO); Erling Tronvik, Buvika (NO); Herindrasana Ramampiaro, Tiller (NO); Stefan Artur Sobczyszyn Borg, Oslo (NO)

(73) Assignees: Norwegian University of Science and Technology (NTNU), Trondheim (NO); Nordic Brain Tech AS, Oslo (NO); St. Olavs Hospital HF, Trondheim (NO)

( * ) Notice: Subject to any disclaimer, the term of this patent is extended or adjusted under 35 U.S.C. 154(b) by 534 days.

(21) Appl. No.: 18/000,695

(22) PCT Filed: Feb. 3, 2021

(86) PCT No.: PCT/EP2021/052512
§ 371 (c)(1),
(2) Date: Dec. 5, 2022

(87) PCT Pub. No.: WO2021/249674
PCT Pub. Date: Dec. 16, 2021

(65) Prior Publication Data
US 2023/0172540 A1 Jun. 8, 2023

(30) Foreign Application Priority Data
Jun. 9, 2020 (GB) ...................... 2008682

(51) Int. Cl.
*A61B 5/00* (2006.01)

(52) U.S. Cl.
CPC ............ *A61B 5/486* (2013.01); *A61B 5/4824* (2013.01); *A61B 5/4836* (2013.01)

(58) Field of Classification Search
CPC ..... A61B 5/486; A61B 5/4824; A61B 5/4836; A61B 5/4094
See application file for complete search history.

(56) References Cited

U.S. PATENT DOCUMENTS 5,343,871 A 9/1994 Bittman et al.
5,694,939 A 12/1997 Cowings
(Continued)

FOREIGN PATENT DOCUMENTS

WO 2006/021820 A1 3/2006

OTHER PUBLICATIONS

International Search Report and Written Opinion, PCT/EP2021/052512, dated May 11, 2021 (15 pp.).
(Continued)

*Primary Examiner* — Rex R Holmes
(74) *Attorney, Agent, or Firm* — Eversheds Sutherland (US) LLP

(57) ABSTRACT

A biofeedback system for headache patients includes a sensor system for obtaining and transmitting data indicative of a number of physiological parameters of the patient, a personal computing device arranged to receive data from the sensor system and to interact with the patient via a user interface of the personal computing device, and a computer-implemented biofeedback agent. The sensor system is configured for measurement of the physiological parameters of the patient, wherein the physiological parameters include at least two of muscle tension, body temperature, heart rate, and heart rate variability.

20 Claims, 2 Drawing Sheets

(56) References Cited

U.S. PATENT DOCUMENTS

| | | | |
|---|---|---|---|
| 6,169,981 B1 * | 1/2001 | Werbos | G05B 13/0285 706/26 |
| 2003/0144829 A1 * | 7/2003 | Geatz | G16H 10/60 703/22 |
| 2019/0313934 A1 | 10/2019 | Lee et al. | |

OTHER PUBLICATIONS

Search Report, GE2008682.3, dated Dec. 10, 2020 (3 pp.).

Alhamid, Mohammed F. et al., "MMBIP: Biofeedback system design on Cloud-Oriented Architecture", Robotic and Sensors Environments, 2012 IEEE International Symposium On, IE, Nov. 16, 2012 (6 pp.).

Stubberud, Anker et al., Biofeedback as Proplylaxis for Pediatric Migraine: A Meta-analysis, Pediatrics vol. 138, No. 2, Aug. 2016 (15 pp.).

Stubberud, Anker, et al., Wireless Surface Electromyography and Skin Temperature Sensors for Biofeedback Treatment of Headache: Validation Sstudy with Stationary Control Equipment, JMIR Biomedical Engineering, 2018 (15 pp.).

Stubberud, Anker, et al., Digital Technology and Mobile Health in Behavioral Migraine Therapy: a Narrative Review. Springer Science+ Business Media, LLC, Jul. 31, 2018 (6 pp.).

\* cited by examiner

BIOFEEDBACK SYSTEM

TECHNICAL FIELD

The present invention relates to a biofeedback system for headache patients, such as migraine patients, as well as to related methods and computer software.

BACKGROUND OF THE INVENTION

Migraine is a heterogeneous group of neurological disorders, of which the dominant feature is severe headache often accompanied by nausea and vomiting, as well as photo- and phonophobia. Migraine is prevalent and according to the 2015 Global Burden of Disease Study, it is the number one cause of neurological disability, and the second most common cause of years lived with disability. The fact that over 1 billion individuals had a headache disorder in 2016 further emphasises the population burden of the disease.

All the while, we live in an emerging era of mobile health and digital technology. Telemedicine and electronic health (eHealth) defines the delivery of health services through telecommunications, while a subcategory of eHealth, labelled mobile health (mHealth), encompasses the use of smartphones, applications (apps), and wearables for medical purposes. eHealth and mHealth represent new means for delivering prophylactic behavioural interventions for migraine. These interventions are established as being effective in reducing the burden of migraine, both in the pediatric and adult population. Common behavioural interventions include relaxation training, biofeedback training, and cognitive behavioural therapy (CBT).

Migraine represents a serious problem among children and adolescents, and this is a set of patients where mHealth is of particular interest. A review of 64 studies estimated the 1-year prevalence of childhood migraine to be 9.1%. This figure is probably an underestimation, however, due to the common practices of using restrictive screening questions and neglecting probable migraine. A recent study reported a 36% one-year prevalence of all migraine among adolescents. For patients, this finding means troublesome symptoms and often a considerable degree of disability with time lost from school, friends, and other activities. From a societal perspective, migraine leads to substantial indirect costs from lost productivity and direct costs for health care.

Despite migraine's high prevalence and morbidity, relatively few prophylactic drugs have been proven effective among children and adolescents, and they are all associated with a risk of adverse effects. Non-pharmacologic treatment (e.g, biofeedback) is therefore an attractive alternative. In biofeedback, patients learn to voluntarily modify their bodily reactions through feedback-mediated awareness of physiologic parameters. Biofeedback reduces cortical excitability and affects resonance and oscillations of essential feedback loops in the central nervous system. The most frequently used modalities in biofeedback treatment are peripheral skin temperature, blood-volumepulse, and electromyography.

Many systematic reviews have reported a favourable effect of behavioural treatments for pain conditions, but they vary greatly in how they applied meta-analytic methodology. Unfortunately, most of these studies have merged different types of psychological treatment and pain conditions, including tension-type headache and migraine. This approach does not allow the conclusion that biofeedback is effective as a migraine prophylactic. To test this conclusion, a systematic review was carried out as presented in the paper by Stubberud A, Varkey E, McCrory D C, Pedersen S A, Linde M: "Biofeedback as Prophylaxis for Pediatric Migraine: A Meta-analysis", Pediatrics, 2016 138 (2): e21060675. This included a meta-analysis of the effect of biofeedback treatment in pediatric migraine.

The objectives of the review were as follows:
(1) to assess the efficacy of biofeedback on primary attack frequency in children and adolescents with migraine;
(2) to assess the efficacy on secondary end points (eg, attack duration, headache intensity, quality of life, disability, acute medication use);
(3) to investigate any potential adverse events associated with the treatment; and
(4) to conduct a risk of bias assessment of the included studies.

This review concluded that biofeedback seems to be effective in reducing the frequency of migraine in the pediatric population, at least when paired together with therapeutic techniques such as relaxation therapy or autogenic training. The same conclusions may be extended to other patients, i.e. non-pediatrics, but it will be noted that the reduced effectiveness of attractiveness of prophylactic drugs for the pediatric population create a more pressing need to find alternative systems for assisting those patients.

When considering biofeedback as a technical solution for assisting migraine patients via electronic behavioural monitoring and control the present inventors are of the view that mHealth is a particularly important area. At the beginning of this decade several researchers praised the potential of eHealth and mHealth for delivering behavioural treatments, and as noted above the mHealth area is attractive when considering improved technologies for aiding the pediatric population. The paper by Stubberud A and Linde M entitled "Digital Technology and Mobile Health in Behavioral Migraine Therapy: a Narrative Review" considered the available recent research and development of eHealth and, in particular, mHealth for migraine, and suggested that electronic behavioural interventions for migraine seem to be acceptable and feasible, but efficacy measures are uncertain, giving prospects for future research and development. It was noted that there is a gap between commercially available apps and scientifically validated and developed apps.

The basic principles of biofeedback for migraine involve measurement of biological parameters of the patient and interaction with the patient's behaviour to allow them to control and/or anticipate migraine attacks. Despite being effective, biofeedback has limited population coverage. This is possibly because it is time-consuming and costly with its provision traditionally through specialist clinics. Typically, to be effective, biofeedback treatment involves a trained therapist, as well as specialized equipment measuring surface electromyography, peripheral skin temperature, or heart rate. One of the building blocks required for a successful mHealth based biofeedback system is therefore the availability of suitable sensors. This was investigated in the paper by Stubberud A, Omland P M, Tronvik E, Olsen A, Sand T, Linde M: "Wireless surface electromyography and skin temperature sensors for biofeedback treatment of headache: Validation study with stationary control equipment", JMIR Biomed Eng. 2018; 3: e1. The aim of this study was to assess the validity of selected wireless wearable health monitoring sensors (WHMS) for measuring surface electromyography (SEMG) and peripheral skin temperature in combination with a mobile phone app. Sensors fulfilling the following predefined criteria were identified: wireless, small size, low weight, low cost, and simple to use. These sensors were connected to an app and used by 20 healthy volunteers.

Validity was assessed through the agreement with simultaneous control measurements made with stationary neurophysiological equipment. The app was programmed to receive data from the wireless sensors, process them, and feed them back to the user through a simple interface. The study showed that suitable sensors were available, and in particular it confirmed the validity of wireless WHMS connected to a mobile phone for monitoring neurophysiological parameters of relevance for biofeedback therapy.

It will hence be seen that there are potential advances to be made with new digital technologies for assisting migraine patients, as well as other headache patients, including wearable sensors and the use of smartphones for medical purposes mobile health (mHealth). Research indicates that behavioural mHealth interventions for headache are feasible, but so far the development processes and usability testing remain insufficient.

SUMMARY OF THE INVENTION

Viewed from a first aspect, the present invention provides a biofeedback system for headache patients, the system comprising:
- a sensor system for obtaining and transmitting data indicative of a plurality of physiological parameters of the patient, the sensor system being configured for measurement of the physiological parameters of the patient, wherein the physiological parameters include at least two of muscle tension, body temperature, heart rate and heart rate variability;
- a personal computing device arranged to receive data from the sensor system and to interact with the patient via a user interface of the personal computing device; and
- a computer-implemented biofeedback agent;
- wherein the personal computing device together with the biofeedback agent are configured to carry out the following steps:
- obtain data indicative of the physiological parameters from the sensor system; instruct the patient to control the physiological parameters;
- determine baseline levels for each of the physiological parameters;
- derive a score for each of the physiological parameters relative to the baseline levels, wherein the score increases in reaction to control of the respective physiological parameter; and
- use a weighting system to determine a weighting for the score associated with each of the physiological parameters and present a total score to the patient via the user interface, the total score consisting of a combination of the weighted scores, wherein the weighting system gives a higher weighting to the score for the physiological parameter that the patient most successfully controls and a lower weighting to the score for the physiological parameter that the patient least successfully controls.

In further aspects, as set out in additional detail below, the invention provides: a method for operating a biofeedback system for headache patients, which may be a system as in the first aspect; and a computer programme product comprising instructions that, when executed, will configure a biofeedback system to operate in accordance with the above, i.e. to operate as the above system and/or to carry out the method. The method may use a biofeedback agent together with the personal computing device to carry out steps as above. The computer programme product may, when executed, configure the personal computing device together with the biofeedback agent to perform steps as above. In each case these further aspects, as well as the first aspect, may include further features as discussed in the following.

With the proposed biofeedback system and/or via associated method/software the patient is given the ability to undertake biofeedback training for improving their capability to control their behaviour and to control associated physiological parameters. The biofeedback agent uses a scoring system does not rely solely on a single parameter, but instead it is arranged to combine weighted scores for the plurality of parameters giving each patient a bespoke compound feedback score that is based on multiple parameters. The weighting system reinforces and amplifies successful control of the physiological parameter(s). This results in an individualised scoring system for each patient that focuses on the physiological parameter where they can demonstrate the most control, which is considered to lead to better results from the biofeedback process as well as allowing it to adapt to variation of physiological parameters within the population, which is known to be a particular feature of the pediatric population.

As set out above, studies have shown the benefits of behavioural therapies using biofeedback, especially in connection with certain pediatric age-groups. Therapy for headaches such as migraines can be conducted with assistance from the biofeedback system and this can allow for enhanced control of migraine/headache, such as via suitable behavioural changes in response to premonitory symptoms. Via the weighting system, the total score is focused on control of physiological parameters where the patient has shown the most aptitude, which may be either from past use of the system and/or during on-going use in a single biofeedback session.

The proposed biofeedback can assist the patient in more successfully accessing and using therapies for treatment of migraine and/or other headaches. In contrast to typical biofeedback systems there is no need for a trained therapist or for the patient to visit a medical facility. Instead they can use their personal computing device, which may be a mobile device such as a smartphone, to conduct regular biofeedback sessions without the need for professional medical personnel or specialist equipment. The biofeedback system may advantageously be configured to be adaptive based on prior sessions with the patient, allowing the biofeedback agent to learning from prior sessions and take this into account when setting baseline levels as well as for other reasons. Thus, stated in broad terms, the biofeedback system may be configured to record data based on prior biofeedback sessions and to adapt current and subsequent biofeedback sessions based on the prior biofeedback sessions. Thus, the biofeedback agent, which may be implemented thorough various forms of software, may have a learning function, which can advantageously be based on machine learning algorithms.

The biofeedback system, via the biofeedback agent and the personal computing device, may also present a real-time indication of the physiological parameters to the patient. This can aid in the patient's control of those parameters. However, it is envisaged that in some cases the patient may achieve better physiological control via the total score absent direct feedback on individual parameters, or by being presented with a realtime indication of a subset of the parameters, or just one parameter. Different patients may react better with different feedback. The biofeedback agent may be configured to vary the amount of information that the patient is given, and thus may be able to present the patient with a realtime indication of all of the physiological parameters, of no physiological parameters, or of one or more parameters selected from the full set of physiological parameters. The biofeedback agent may record the patient's degree of success in controlling the physiological parameters with reference to the information presented to the patient and learn the most successful outcomes from the current biofeedback session and past biofeedback sessions, hence permitting future sessions to adapt what is presented to the patient to aid the patient in increasing the scores for each parameter.

The sensor system may include one or more sensors for measurement of the physiological parameters, which may be measured via any suitable means. These sensors may be comprised within the biofeedback system. In this instance a sensor may be any device capable of enabling a suitable measurement, which may be a measurement unit (e.g. a thermistor) of a measurement device or may be the measurement device itself (e.g. the thermistor together with associated parts such as battery, PCB, MCU and so on). In the case of muscle tension, the sensor system may include an electromyography sensor, such as a surface electromyography (SEMG) sensor for attachment to the patient's skin at a suitable location, for example at the patient's neck muscles. For body temperature the sensor system may include a temperature sensor of any suitable type, such as a surface/skin temperature sensor for mounting on the patient's finger or wrist. Heart rate and/or heart rate variability may be measured with any suitable sensor, typically a surface mounted sensor. Conveniently, where heart rate is used together with body temperature, then a finger mounted sensor can also register the heart rate and/or heart rate variability. The physiological parameters may include further parameters such as galvanic skin response, and/or electroencephalography which may be obtained from the same sensor as is used to measure heart rate.

The sensor system may transmit data from the sensors with any suitable means, such as wired or wireless transmission systems, but it will be appreciated that wireless systems are considered to give advantages in terms of ease of use. Thus, it is envisaged that most examples will make use of wireless data transmission. Where multiple separate sensors are used there may be a wireless data transmission device for each sensor, or at least a wireless data transmission device for each part of the body involved in interactions with the sensor system. This avoids the need for physical connections between different parts of the patient's body, such as between a finger temperature and heart rate sensor, which may have a first wireless data transmission device, and a surface electromyography sensor attached to muscles at the patient's neck, which may have a second wireless data transmission device. The wireless data transmission device may use any suitable wireless system, such as Bluetooth or similar. Where the personal computing device is a smartphone then the sensor system may conveniently use a wireless system supported by smartphones.

The plurality of parameters may comprise two of three parameters selected from only three of the four parameters mentioned for the first aspect. For example, the parameters may be two, or all three of muscle tension, body temperature and heart rate. Thus, the sensor system may take measurements of all three of muscle tension, body temperature and heart rate, as well as optionally further parameters such as heart rate variability. The scoring would then include scores for at least three parameters, with the weighting being higher for the most successful of the three and lower for the least successful of the three, with success being defined based on the ability of the patient to control the respective parameter. The weighting system may apply weighting to intermediate parameter(s) between the most and least successfully controlled parameters, which may be determined based on a degree of control of said intermediate parameter(s). Alternatively, in a simple implementation the weighting system may make not adjustment to the scoring for the intermediate parameter(s), i.e. with no weighting applied when the control of a particular physiological parameter is neither the most nor the least successful. The parameters may include all four of muscle tension, body temperature, heart rate and heart rate variability. In that case there would be at least four scores, with the weighting system adapted accordingly. Further details of possible features of a weighting system are discussed below.

The biofeedback agent is arranged to determine baseline levels for the physiological parameters, with these baseline levels advantageously being determined individually for each patient. The determination of the baseline levels may be done adaptively with changes to the baseline levels taking account of the patient's past performance and/or changes during a biofeedback session if current values (i.e. measured values from the sensors) for the physiological parameter indicate that changes may be useful.

The baseline levels may include a low baseline level and a high baseline level, with the range between the low baseline level and the high baseline level being a range that encloses normal values of the patient's physiological parameters. One of the baseline levels may define a target value, which is a value of the physiological parameter toward which the patient may be instructed to control their body. The target value may be either the low baseline level or the high baseline level depending on the physiological parameters. As is known in relation to biofeedback systems, and in particular those for migraine patients, it is desirable for some parameters to be controlled to reduce them, whereas for others it is better to increase them. The other of the baseline levels, i.e. the one of the low baseline level or the high baseline level that is not the target value, may define an outer bound for normal variation of the physiological parameter. The biofeedback agent may be arranged to determine the score using the size of the range between the baseline levels, and the degree of success of the patient in controlling the parameter toward the target value. Thus, a current value that moves closer to the target value may increase the score. For the same difference, in absolute terms, between the current value and the target value then a larger range between the high and low baseline levels may give a higher score. A possible scoring system is further explained below.

The biofeedback agent may be configured to set initial baseline levels for a new patient based on ranges for the physiological parameter that are expected to capture normal values for all patients. This would tend to ensure that new patients will have total scores in the middle range, e.g. 30-70% for total scores expressed in percentage terms. The initial baseline levels may hence have a relatively high range. For example, initial values for heart rate may include at least the range 40-100 beats per minute, such as by having a range of 25-110 beats per minute, and initial values for body temperature may include at least the range 36-38° C., such as by having a range of 35.5-38.5° C. It will of course be appreciated that in some cases the initial baseline levels may vary depending on the particular sensors used for the sensor system and on their intended placement on the body.

During use of the system the baseline levels may be adjusted compared to the initial baseline levels in order to: reduce the size of the range between the high and low baselines; to move the target value toward an expected achievable value for the patient; and/or to make the target value more difficult to achieve as the patient becomes more successful at controlling the physiological parameter. This may be done during a biofeedback session or based on prior performance of the patient in past biofeedback sessions. To facilitate this, the biofeedback agent may be configured to record the values of the physiological parameter achieved by the user and to use past values from a current biofeedback session or from one or more prior biofeedback sessions to determine a suitable adjustment to the baseline levels. For example, one or both of the baseline levels may be set to be within a certain percentage of an average value for the physiological parameter over a certain number of the patient's most recent biofeedback sessions. The target value, i.e. the high baseline or the low baseline as the case may be, may be adjusted based on the best value achieved by the patient, with the best being defined as that which is closest to the target value. The target value (and hence the respective baseline level) may be adjusted to be closer to the best value achieved by the patient if the patient consistently fails to achieve a high score for the parameter in question, such as during an initial settling in period. For example, if the score in percentage terms is consistently below 50% then the target value may be gradually reduced until consistent higher scores are achieved. The target value (and hence the respective baseline level) may be adjusted to increase it to move it further from the best value if the patient has become increasingly successful and/or if they consistently reach a score over a set threshold. For example, the target value may be increased if the patient consistently reaches a score of over 90%, or equivalent if not expressed in percentage terms. The patient's performance, in terms of consistent levels, may be assessed over a certain number of the patient's most recent biofeedback sessions.

The certain number of the patient's most recent biofeedback sessions referenced above may be the same in each case, or it may differ. The number may be selected as at least the 10 most recent sessions, or at least 20 of the most recent sessions, for example it may be the 30 most recent sessions. For the initial sessions it may involve use of fewer prior sessions, such as where there have not yet been 10 sessions, in which case all of the prior sessions may be used. Where average values are used this may be a mean average or it may be a median average.

The biofeedback agent is arranged to derive a score for each of the physiological parameters, i.e. a score for each of physiological parameters such as body temperature, heart rate or muscle tension. The scoring may be done continually during use of the biofeedback system, such as by periodically sampling the data to obtain a current value for the physiological parameter and calculating a score for the sampled value. This then allows the total score to be continually updated and presented to the patient via the user interface to provide real-time feedback during their attempts to control the physiological parameters and hence to increase the total score.

The score may be calculated based on proximity of the current value for the physiological parameter to a target value provided by a suitable baseline level, which as noted above may be the low or high baseline level dependent on the parameter in question. The other of the low or high baseline levels may be used to normalise the score to allow the difference to the target value to be presented as a decimal or percentage value. This then allows for direct comparison between scores relating to the different physiological parameters. It will be noted that in accordance with typical biofeedback systems some of the physiological parameters may be controlled to lower values, such as muscle tension and heart rate, whereas others may be controlled to higher values, such as body temperature. The biofeedback agent may include a scoring system that uses two functions to determine the score, one for a target value based on lowering the parameter and one for a target value based on increasing the parameter. In one example the score is calculated using the difference between the current value and the target value, divided by the difference between the high and low baseline levels. The score may be provided as the result of that calculation, optionally converted into a percentage value.

The weighting system determines a weighting for the score associated with each of the physiological parameters and present a total score to the patient via the user interface. The total score consists of a combination of the weighted scores and may for example be simply a sum of the weighted scores, optionally adjusted to be presented in percentage terms. As noted above, the biofeedback agent is arranged so that the weighting system gives a higher weighting to the score for the physiological parameter that the patient most successfully controls and a lower weighting to the score for the physiological parameter that the patient least successfully controls. The degree of success of the patient may be assessed based on the scores for each physiological parameter, with the parameters being ranked from highest to lowest based on the highest to lowest scores. The weighting for the score may be a multiplier for the score. To normalise the weighting process then the sum of the weighting multipliers may be set to one. With the use of a weighting multiplier then the higher and lower weighting that is used to reflect the more and less successful control of parameters may be implemented by addition of a constant to the weighting multiplier for the physiological parameter with the highest score, and subtraction of a constant from the weighting multiplier for the physiological parameter with the lowest score. With a system where the sum of the weighting multipliers is set one then the same constant may be used for the addition and subtraction, with the constant typically being in the range of 0 to 1. If there are a higher number of parameters, such as four or more, then the intermediate parameters may also have variable weighting dependent on their ranking in terms of the patient's success. For example, there may be addition of a second, lower, constant to the weighting multiplier for the physiological parameter with the highest score, and subtraction of the second, lower, constant from the weighting multiplier for the physiological parameter with the lowest score. Optionally, this can be extended for further additional parameters, if used.

The weighting system may start each biofeedback session with equal weighting for each physiological parameter. Alternatively the biofeedback system may log the weighting used for the last session, or monitor a modal average over a number of the most recent sessions, in order to begin a new session with weighting that reflects the likely required weighting for the patient.

The weighting may be adjusted periodically based on a prescribed time period and/or may be adjusted automatically when changes in the scores indicates a change in the ranking of the physiological parameters by the patient's success, such as by automatic updates to the weighting values. By adjusting the weighting automatically then the biofeedback system can adapt for changes in patient condition or external conditions that may cause the patient's control of one or more parameters to vary, for example recent exercise, extremes of ambient temperature or technical issues such as a misplaced or differently placed sensor. Thus, the weighting used within different biofeedback sessions may be able to adapt as appropriate in order to give greater precedence to the scores for the parameters that the patient can most successfully control in a given session.

The constants used to adjust the weighting values, e.g. constants for the weighting multipliers discussed above, may optionally be adjusted to change the impact of the weighting system. Such adjustments may be applied systematically in reaction to trends in the patient's ability to control the parameters and/or may be applied randomly to test if adjusted weighting may positively or negatively impact on the patient's degree of success in controlling particular parameters.

The biofeedback agent is computer implemented and may primarily or entirely be implemented via software. The biofeedback agent can interact with the personal computing device during the steps set out above. The biofeedback agent may comprise software installed on the personal computing device, such as via an app, which may configure the personal computing device to carry out core functions of the biofeedback agent in connection with obtaining the data indicative of the physiological parameters and presenting feedback to the patient, such as presenting information via the user interface of the personal computing device, including the total score and optionally one or more of the physiological parameters from the sensor system. The biofeedback agent further comprises software for carrying out the scoring and weighting steps, which may also be a part of the app. As well as software located on the personal computing device the biofeedback agent may comprise software remote from the personal computing device, being located within a separate server and/or in the cloud. Such remote software can have greater complexity and may more readily store more data than the app on the personal computing device. The biofeedback agent may comprise remote software and/or use remote data storage, i.e. software and/or data storage not on the personal computing device, in connection with some steps linked with weighting and scoring, such as storage of information relating to prior sessions and/or determination of suitable initial weighting to use at the start of future sessions. Remote parts of the biofeedback agent may also conduct other operations such as those discussed below in relation to: tracking the patient's performance and/or symptoms, learning functions, prediction functions, and so on.

The biofeedback agent may be configured to request and record patient data in connection with the patient's symptoms, in particular those linked with the patient's migraine or other headache. Thus, the biofeedback agent may be configured to register one or more of: the incidence of migraine; headache parameters and/or frequency; and/or premonitory symptoms. Alternatively or additionally the biofeedback agent may be configured to request and record patient data in connection with the patients usage of other medication or of other therapy. Recording such data allows tracking of the patient's condition, which may advantageously replicate some or all aspects of a known "headache diary", and doing this in conjunction with the proposed biofeedback system allows for this information to be utilised along with regularly measured physiological parameters and the above discussed scores. The biofeedback agent may be configured to identify trends in physiological parameters and/or symptoms, either alone or in combination, that link with increases and/or decreases in the risk of a migraine or other headache. Machine learning algorithms may be used to identify patterns and make forecasts. The biofeedback agent may hence be configured to present the patient with a prediction of likelihood of migraine or other headache, for example with reference to the coming hours or days. In addition, or alternatively, the biofeedback agent may be configured to provide guidance to the patient to prompt behavioural changes to reduce the risk of a future migraine or other headache. Such a recommendation may take the form of a selection of a particular physiological parameter as the focus for biofeedback, and this may be done either overtly, such as via a direct instruction to the patient to control a particular parameter or parameters and/or covertly, such as via an adjustment of the weighting system to focus on control of a particular parameter or parameters.

The biofeedback agent may be arranged to adjust the weighting based on past performance as noted above. Thus, the weighting may be described as performance aware. The biofeedback agent may comprise a cost function that is optimised taking account of performance criteria, which may include symptoms and/or the incidence of migraine or other headache as discussed above. The cost function may take account of the success of the patient in particular sessions with reference to headache/migraine reduction. The cost function may take account of the impact of success in relation to particular individual parameters with reference to headache/migraine reduction.

Alternatively or additionally the biofeedback agent may be configured to take a measure of the engagement of the patient, and to react to this, for example by adjusting the weighting. To implement an engagement aware biofeedback agent the biofeedback system may comprise a user engagement sensor for determining if the patient is attentive or not. One example of this is to use a camera of the personal computing device. This may be as a camera of a smartphone that can see the user as the user faces a display of the personal computing device, which can be at least a part of the user interface as set out below. A camera of the personal computing device may be used to provide images for facial recognition and/or eye-tracking, with the personal computing device and/or the biofeedback agent being configured to determine, based on the images, if the user is facing the personal computing device and/or their eyes are focused on the personal computing device.

Another possibility for an engagement aware biofeedback agent is to make an estimate of the degree of engagement based on analysis of usage patterns and/or feedback from the patient, which may take the form of an empirical assessment by the patient of their degree of engagement. These types of measures of engagement may be used alone or in combination with the use of a camera as set out above.

Optionally, the engagement aware biofeedback agent may be arranged to interact with the patient, such as via the user interface, in order to increase or decrease the degree of engagement. This may be done, for example, by issuing instructions to the user, or by actions providing prompts to the user to re-engage, such as via patterns or sounds.

The engagement aware biofeedback agent may comprise a cost function as set out above, with the cost function taking account of the measure of the degree of engagement of the patient. The cost function may take account of the impact of engagement with reference to headache/migraine reduction, which can optionally be done in addition to performance aware aspects of the cost function.

In context of an engagement aware and/or performance aware biofeedback agent, adjustments to the weighting may include changes to the constants referenced above in relation to weighting values.

The biofeedback agent may be configured to present the patient with a choice of parameters to focus on, allowing for a particular biofeedback session to be bespoke to user preferences. Other biofeedback sessions may be absent the option for a patient choice of this type. The biofeedback agent may further be configured to determine the impact of this with reference to headache/migraine reduction, such as by incorporating the presence or absence of a patient choice into the cost function.

The user interface is utilised to present the patient with the total score and optionally also with a realtime indication of one or more of the various physiological parameters measured by the sensor system. The biofeedback agent may be arranged to make changes in the user interface in relation to one or more of adjusting the information presented to the patient, giving feedback or prompts to the patient and/or presenting choices to the patient, such as the parameter choices discussed above. Such changes to the user interface may be done to prompt improved biofeedback scores and/or to aid the patient in controlling a migraine or other headache, such as through changes based patterns learnt from past biofeedback sessions. This may be done with reference to current/incipient migraine/headache symptoms or with reference to a likelihood of a future migraine or other headache, such as a migraine forecast via a feature of the biofeedback agent as discussed above. The changes to the user interface may alternatively or additionally be done experimentally, to assess the impact on the patient's success in relation to control of the physiological parameters. For example, they may be done randomly and/or within assigned training sessions. This can aid the biofeedback agent in learning what impact such changes may have on future biofeedback sessions.

The personal computing device may for example be a smartphone as mentioned above. Alternatively, it may be any other suitable device capable of the required interactions with the patient and being able to work appropriately with the computer implemented biofeedback agent. For example, the personal computing device may be a tablet, laptop or desktop computer. The personal computing device comprises the user interface as well as suitable hardware and software allowing it to operate in combination with the biofeedback agent. The user interface may be a display screen, such as a touch screen. The user interface may alternatively or additionally use a speaker with feedback to the patient via sounds. Optionally, the user interface may comprise an output from the personal computing device for operating a secondary interface for displaying information, such as a connection for operating a stand alone computer display or television device. The personal computing device may comprise the sensor system and/or elements thereof. For example, a camera or other peripheral of the computing device may be used as one of the sensors. Alternatively, the sensors may be provided entirely separate to the personal computing device, for example with the sensor system connected to the personal computing device only for providing data relating to the physiological parameters.

Viewed from a second aspect, the present invention provides a method for operating a biofeedback system for migraine patients, the biofeedback system comprising: a sensor system; a personal computing device; and a computer-implemented biofeedback agent;
the method comprises:
using the sensor system for obtaining and transmitting data indicative of a plurality of physiological parameters of the patient, wherein the physiological parameters include at least two of muscle tension, body temperature, heart rate, and heart rate variability;
using the personal computing device, receiving data from the sensor system; and
using the personal computing device together with the biofeedback agent to carry out the following steps:
obtain data indicative of the physiological parameters from the sensor system;
instruct the patient to control the physiological parameters;
determine baseline levels for each of the physiological parameters;
derive a score for each of the physiological parameters relative to the baseline levels, wherein the score increases in reaction to control of the respective physiological parameter; and
use a weighting system to determine a weighting for the score associated with each of the physiological parameters and present a total score to the patient via the user interface, the total score consisting of a combination of the weighted scores, wherein the weighting system gives a higher weighting to the score for the physiological parameter that the patient most successfully controls and a lower weighting to the score for the physiological parameter that the patient least successfully controls.

The method of the second aspect may use a biofeedback system having any of the features discussed above, with the biofeedback agent and/or the personal computing device carrying out steps as discussed above.

Viewed from a third aspect, the present invention provides a computer programme product for a biofeedback system comprising a sensor system and a personal computing device, the computer programme product comprising instructions that, when executed, will provide the biofeedback system with a biofeedback agent and configure the biofeedback system such that it will:
using the personal computing device, receive data from the sensor system; and
using the personal computing device together with the biofeedback agent, carry out the following steps:
obtain data indicative of the physiological parameters from the sensor system;
instruct the patient to control the physiological parameters;
determine baseline levels for each of the physiological parameters;
derive a score for each of the physiological parameters relative to the baseline levels, wherein the score increases in reaction to control of the respective physiological parameter; and
use a weighting system to determine a weighting for the score associated with each of the physiological parameters and present a total score to the patient via the user interface, the total score consisting of a combination of the weighted scores, wherein the weighting system gives a higher weighting to the score for the physiological parameter that the patient most successfully controls and a lower weighting to the score for the physiological parameter that the patient least successfully controls.

The method may use a biofeedback agent together with the personal computing device to carry out steps as discussed above with reference to the biofeedback agent and personal computing device of the first aspect.

BRIEF DESCRIPTION OF THE DRAWINGS

Certain example embodiments of the present invention will now be described by way of example only and with reference to the accompanying drawings in which.

DETAILED DESCRIPTION

Figure 1:
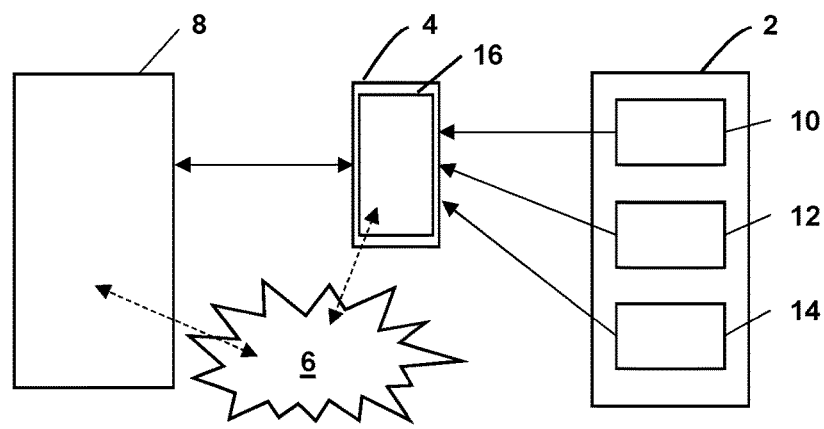
FIG. 1 shows a schematic for a biofeedback system.

A basic biofeedback setup, as shown schematically in FIG. 1, includes a sensor system 2 as well as a personal computing device in the form of a mobile device 4, in this case a smartphone 4. A biofeedback agent 6 is provided via software on the smartphone 4 and at a remote server 8, which also provides data storage for the biofeedback agent 6. The sensor system 2 comprises a plurality of sensors 10, 12, 14 for measuring physiological parameters in the form of muscle tension, body temperature, and heart rate. The selected sensors 10, 12, 14 all transmit signals via Bluetooth® Smart/4.0 to the smartphone. Muscle tension can be measured via a small compact bipolar surface electromyography sensor 10, such as the NeckSensor™ marketed by EXPAIN AS of Oslo, Norway. In this example the electromyography sensor 10 is used for measuring muscle tension from the upper trapezius muscle fibres. For body temperature measurement the sensor system 2 includes a finger temperature sensor 12, which are widely available from numerous sources. Typical sensors are either mounted to a fingertip or may be held by the patient. The heart rate can be measured via a heart rate sensor 14 such as a wristband sensor, for example a MIO Fuse™ heart rate wristband as supplied by Mio Global, Physical Enterprises. Such a sensor can be used to measure heart rate over the dorsal aspect of the wrist. A heart rate sensor can also supply measurements of heart rate variability, which may provide a further physiological parameter.

The smartphone 4 includes a user interface, primarily provided by the display screen 16, but also optionally using a speaker for audible feedback or prompts to the patient. When the biofeedback agent (described in more detail below) is in use then the display screen 16 can present the patient with a total score along with a realtime indication of the physiological parameters as measured by the sensors 10, 12, 14. The total score may be shown in graphical form, such as through a chart representing a percentage value or the like. The physiological parameters may be presented on the same screen or on a different screen to the total score, either shown separately or in combination, such as via bar charts or a "slider" display.

In use, the biofeedback agent 6 together with the smartphone 4 and sensor system 2 are used to obtain data for the physiological parameters, which are then used to generate scoring, such as via the example set out below. This scoring combines all of the physiological parameters (i.e. all three of heart rate, body temperature and muscle tension in this case), which contrasts to traditional biofeedback where a single parameter is used. This overcomes challenges that arise in that not all biofeedback patients experience an influence over the physiological parameter measured, and that different parameters may be useful to varying degrees for different patients. For instance, if a patient excels at raising their finger temperature, but has trouble lowering their heart rate, the currently proposed biofeedback agent algorithm will "fade out" the latter to some extent throughout the session and thereby generate a more appropriate and "personalized" total score for each individual patient. Comparably, the parameter that is most efficient for each patient, i.e. where they are most successful in controlling it will be given the heaviest weighting in the combined feedback score. It has been shown that biofeedback systems have greater benefits to the patient when the patient is able to improve their "score". The proposed biofeedback system can automatically adapt to give each different patient the best opportunity to achieve this, by focusing on where they achieve the most success. Additionally, the ability for personalised and adaptive scoring of physiological parameters selected from a suitable set of multiple parameters adds significant benefits for patients that display greater variance in their physiological properties, which is a known issue for the pediatric population. The proposed biofeedback agent can hence provide robust therapist independent treatment, with particular benefits for pediatric migraine patients.

EXAMPLE

An example is set out below to demonstrate one implementation for the proposed biofeedback system, including calculations that may be used for the scoring and weighting systems. It will however be appreciated that the biofeedback system may be implemented in various ways, with alternatives compared to those in the specific example below.

A biofeedback agent 6 is software that enables personalised biofeedback for the individual user. An exemplary biofeedback agent 6 is described as follows with reference to FIGS. 2, 3 and 4, and is built to maximize the efficacy of biofeedback training, by using principles from motivational psychology, neurology and machine learning.

The underlying motivational psychology is described below, with reference to FIG. 2. The architectural components of the biofeedback agent are described with reference to FIG. 3. The following description provides the hierarchical architecture of the different components of the biofeedback agent 6 and the composition of these components.

Principles

The successful use of biofeedback, either in collaboration with a real or an artificial therapist 38 is predicated on acquiring voluntary control of bodily functions. A natural goal for a biofeedback agent 6 is then to ensure that such acquisition is optimized with regards to time of acquisition and churn, and that such voluntary control converge towards some threshold value. In addition, once voluntary control is acquired for an individual, the goal is to maintain and further develop such voluntary control over an extended period of time to reap its benefits.

Biofeedback is a process whereby electronic monitoring of a normally automatic bodily function is used to train someone to acquire voluntary control of that function. The above-mentioned principle is not restricted to any particular use case. However, in the present invention it is applied towards the reduction of headache frequency, duration and intensity. The concepts described in this section do not depend on this particular application, but is a general framework for applying motivational theory to minimize acquisition time and churn, and maximize engagement and bodily control.

Terminology and Notation

Two reward systems can be distinguished: in-session rewards 20 and between-session rewards 22. The purpose of the former is to increase engagement and promote correct behaviour during biofeedback training and the latter to maintain interest in the training for long enough to see a lasting effect from gaining voluntary control of bodily functions. This distinction creates a clear boundary between the inner workings of the biofeedback agent 6 during a session and after/between sessions.

Figure 2:
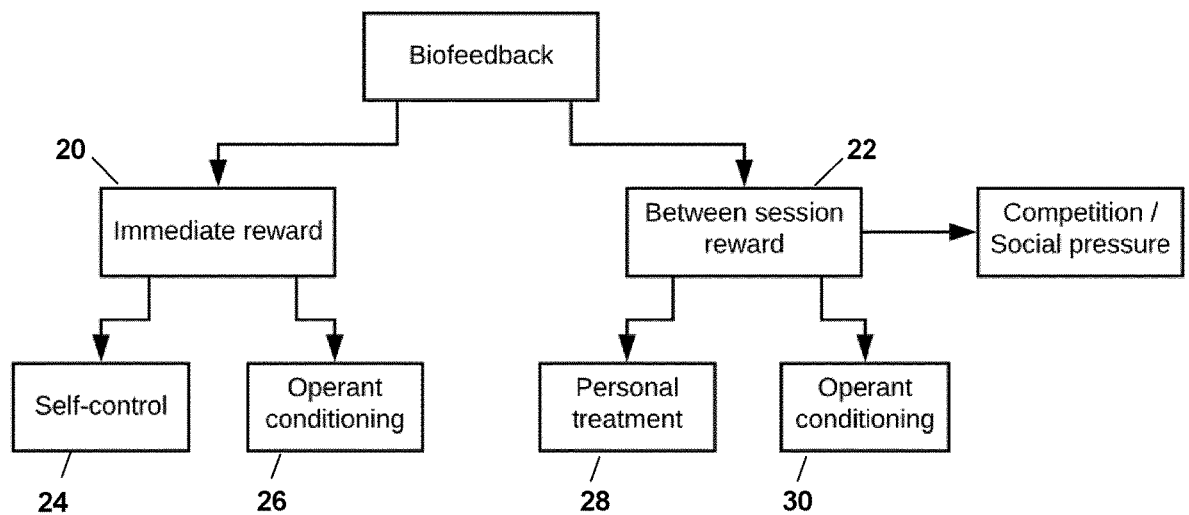
FIG. 2 shows a schematic of a reward system for a biofeedback system.

FIG. 2 illustrates the two reward systems used by the biofeedback agent 6, which is described in more detail below.

In-Session Rewards

In-session rewards 20 provide motivation on a short time-scale, i.e. minutes, seconds and milliseconds, during biofeedback training. The in-session reward 20 can further be divided into two categories, motivation through self-control 24 and operant conditioning 26, as shown by FIG. 2.

Operant Conditioning

Operant conditioning 26 is a type of associative learning process through which the strength of a behaviour is modified by reinforcement or punishment. It is also a procedure that is used to bring about such learning. The behaviour modifying techniques described herein are positive reinforcement and positive punishment.

Positive reinforcement increase correct behaviour by introducing a rewarding stimulus, for example, the graphical visualization of a reduced Heart Rate when the user 50 manages to reduce it.

Positive punishment reduce wrong behaviour by introducing an aversive stimulus, for example, the graphical visualization of an increased Heart Rate.

The focus is to use feedback as positive reinforcement and punishment, and avoid guidance to the degree possible. The degree of guidance necessary to achieve bodily control is determined by a therapist 38 and will vary as the user 50 trains over time. The effect of guidance and the reason why it varies is covered below. Additional layers of positive reinforcement are introduced through: a weighting scheme, see below, that prioritize the bodily functions that the user 50 has the most success in controlling when forming a total score; adaptive baselines, see below, that modify the scoring of an individual bodily function based on performance; and In-session rewards for achieving short-term goals, determined through gamification.

Motivation Through Self-Control

Motivation through self-control is the result of experiencing increased voluntary control of bodily functions through self-learning. That is, users become aware of their ability to control bodily functions and finds out for themselves how they can affect how these bodily functions vary. The result is an immediate reward resulting from, for example, seeing the changes occur through graphical elements on a screen. This stands in contrast to the more basic principles set out above, which describe how data presented to the user 50 is modified to unconsciously motivate him.

Between-Session Rewards

Between-session rewards 22 provide motivation on a long time-scale, read days, weeks and months, between biofeedback training sessions. The between-session reward 22 system can further be divided into two main categories, personal training 28 and operant conditioning 30, as shown in FIG. 2.

Operant Conditioning

The same basic principle as described above holds when applied to a longer time-scale. The mechanism, however, by which it is applied is different. In addition to the behaviour modifying techniques described above, negative reinforcement is also consistently applied. Take the application of promoting headache reduction, for example. The presentation of a reduction in headache attacks reinforce the behaviour of performing biofeedback training. This provides the foundation for the long-term strategy of the biofeedback agent 6.

Personal Training

Personal training is the effect of feedback and guidance adapting to the individual user 50 over time. The intention is that such adaption makes the training more captivating by providing helpful and meaningful guidance. The purpose is to avoid extinction of the desired behaviour, to put it in terms of operant conditioning 30, which is the user 50 completing biofeedback training sessions regularly and gradually improving while doing so. By changing the degree of guidance stagnation is reduced, and it avoids the user 50 not knowing what to do if they do not manage to improve. The focus is therefore to vary the degree of guidance and the scaling of feedback to adapt the in-session experience based on long-term performance. This can be thought of as tweaking the difficulty of the biofeedback training based on performance. Additional elements that are included, but not described in detail for brevity, is: performance rewarded with increased responsibility and less guidance; motivating remarks based on performance; statistics and data visualization.

Biofeedback Agent

Figure 3:
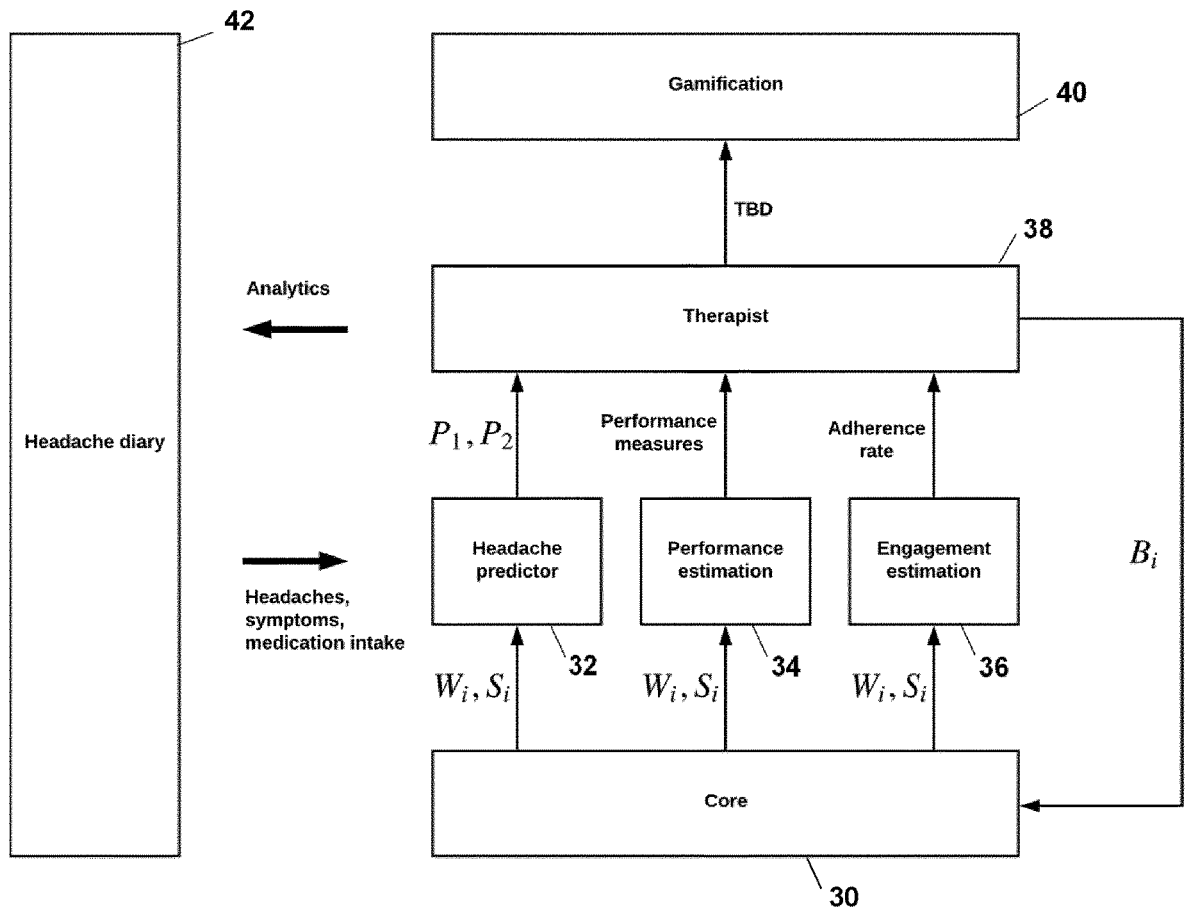
FIG. 3 shows a communication flow overview for a biofeedback agent.

The biofeedback agent 6 is software built to instantiate the principles described above. FIG. 3 illustrates a set of five conceptual layers of the biofeedback agent, each with a separate set of functions. The layers are respectively, the core 30 (biofeedback training session software), middleware 32, 34, 36, (application specific), therapist 38 (AI), gamification 40 (UI) and logging/analytics 42 (diary). The first layer, the core 30, consists of the working software that provides user feedback during a biofeedback training session. The second layer, the middleware 32, 34, 36, is composed of multiple independent algorithms designed to derive characteristics of the user state (performance, engagement, etc.) based on different data sources. The third layer, the therapist 38 (or AI if you will), finds the optimal strategy for the user 50, and provides guidance to maximize user performance. The outermost layer is the gamification layer 40, which modifies the user interface 16 according to the strategy determined by the therapist 38. The final layer 42 is for logging and analysing data related to long-term performance, for example a headache diary as depicted in the instance of this architecture in FIG. 3.

Core

The algorithm of the core 30 is an adaptive weighting scheme. During a biofeedback session, the user 50 wears sensors 10, 12, 14 that measure a set of physiological variables. These physiological variables in this example include: Heart rate (HR), Heart rate variability (HRV), Peripheral finger temperature (Temp), and Neck tension (sEMG), but may include just two of these variables or more.

These physiological measurements are streamed to a native mobile application which derives an individual score, $S_i \in [0,100]$, for each of these measurements relative to a baseline. The baseline is computed individually for each user 50 and for each modality. The scores are then rated relative to each other with the purpose of deriving user performance. This rating lays the foundation for modifying the relative weighting between measurement scores when computing a total biofeedback score:

$$W_{HR} + W_{HRV} + W_{Temp} + W_{sEMG} = 1 \tag{1}$$

$$W_{HR}S_{HR} + W_{HRV}S_{HRV} + W_{Temp}S_{Temp} + W_{sEMG}S_{sEMG} = S_{tot} \tag{2}$$

where $S_{tot}$ is the total biofeedback score. The scores are computed using the equations:

$$\frac{y_i - B_{i,low}}{B_{i,high} - B_{i,low}} \cdot 100 = S_i$$

$$1 - \frac{y_i - B_{i,low}}{B_{i,high} - B_{i,low}} \cdot 100 = S_i \qquad (5)$$

where i is the physiological modality being scored. Equation (3) provide scores for values that are to be controlled to larger values such as $y_{temp}$, whereas equation (4) provide scores for values that are to be controlled to smaller values such as $y_{HR}$. The values of the weights initially define the physiological parameters the user 50 manages to control, or more precisely, the parameters the user 50 manages to control the most. That is, the weights are adjusted on the fly using a constant adaption rate k>0. The physiological parameter the user 50 manages to control the most is thereby given the most significance in the computation of $S_{tot}$, see equation (2).

Let I be a nonempty set containing the indices for the physiological parameters measured during a biofeedback training session.

Let $s_i^{min}$, $s_i^{max}$ i∈I be the minimum and maximum scores of the physiological parameters measured at each time instant during the biofeedback training session. The weight of the physiological parameter corresponding to the maximum score is adjusted according to the formulae $$W_{i+1} = W_i + k \qquad (5)$$

with the minimum score adjusted according to $$W_{i+1} = W_i - k \qquad (6)$$

The weights have to be non-negative $W_i>0$ and saturated such that $W_i \leq 1$. This is mainly to avoid divergence and numerical issues in equations (1)-(2).

The general set of equations are;

$$\Sigma_{i \in I} W_i = 1 \qquad (7)$$

$$\Sigma_{i \in I} W_i S_i = S_{tot} \qquad (8)$$

with I from above.

Figure 4:
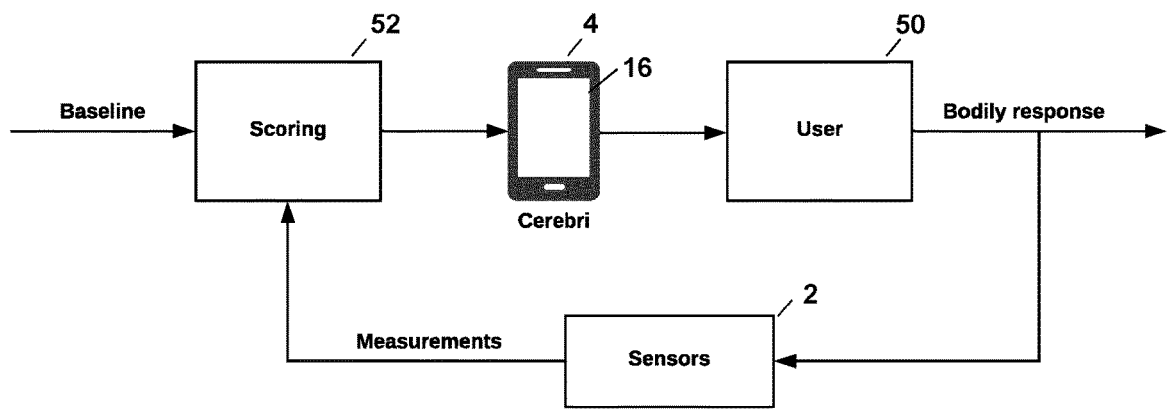
FIG. 4 shows a core feedback loop of a biofeedback session.

The individual scores are displayed and visualized during a biofeedback session to provide immediate feedback to the user 50. The goal of such a session is for the user 50 to try and maximize the score and control his physiological state. The scoring scheme itself is a means to help the user 50 achieve that target by creating a closed feedback loop and being a source of immediate motivation, see above. This closed feedback loop is illustrated in FIG. 4 in which the user's physiological variables are measured by the sensor system 2, scored with reference to the baseline values and displayed to the user 50 via the user interface 16 of the personal computing device 4.

Middleware

The middleware 32, 34, 36 is a set of algorithms that independently estimate qualities related to the state of the user 50. Examples of such algorithms are performance estimators 34 and engagement estimators 36. As illustrated in FIG. 3, the middleware 32, 34, 36 can be composed of multiple independent algorithms. These algorithms are plugged in between the core 30 and the therapist 38, and receives inputs from the core and the long-term data logger 42. In the current example inputs to the middleware may include:

| Inputs | Notation | Origin layer |
|---|---|---|
| Weights | $W_i$ | Core |
| Scores | $S_i$ | Core |
| Headaches | $H_N$ | Diary |
| Headache days | $D_{N_j}$ | Diary |
| Symptoms | n/a | Diary |
| Medication intake | n/a | Diary |
| Session history | n/a | Diary | where headaches, headache days, symptoms, medication intakes and the session history are arrays of data going N days back in time. An exemplary stack of middleware algorithms include a headache predictor 32, a performance estimator 34, and an engagement estimator 36.

The remaining parts of this section will describe these algorithms in detail including how the middleware 32, 34, 36 can be composed to provide data to the therapist 38.

Headache Predictor

The headache predictor 32 uses Machine Learning to predict whether a headache will occur tomorrow given session results and longitudinal data from a headache diary 42. The state space of the output is Boolean, meaning that in practice someone either has a headache or they do not. The output from the headache predictor on the other hand is continuous, $P_1 \in [0,1]$, and describes the probability of a headache occurring tomorrow.

A verified implementation of this algorithm uses the Random Forest algorithm with boosting. The validation of other algorithms and the iterative adaption of such algorithms towards the user 50 is only limited by data. As the current results are based on an ensemble of different people, it is expected that training models on a fewer amount of people over a longer period will increase accuracy.

Performance Estimator

Performance can have multiple definitions in the context of biofeedback applied to people with headaches and migraines. The performance estimator 34 can relate to the user's 50 ability to control physiological signals or the actual reduction of headaches. They describe how good the user 50 is at biofeedback itself and how good an effect the biofeedback, as it is currently being performed, has on headache/migraine reduction. The following can henceforth be derived to describe such effects: Headache Occurrence (HO) rate–The reduction in the number of headaches per month; Headache Duration (HD) rate–The reduction in the duration of headaches, on average, per month; Headache Intensity (HI) rate–The reduction in the intensity of headaches, on average, per month; Score Improvement rate–Improvement rate of scores for each modality and in total; Weight disparities–Disparity between all weights.

Engagement Estimator

Engagement defines how dedicated the user 50 is with respect to performing biofeedback. The engagement estimator 34 is important for knowing if the user needs an extra push, or whether the user interface 16 needs modification. Examples of an engagement measures are: Session adherence-Adherence rate to session schedule; User engagement rating-Rating RE [1,5] provided by the user as answer to an engagement query. The engagement estimator 34 may include a sensor to determine a degree of engagement of the user, such as via use of the camera of a smartphone.

Therapist—Baseline Adaption

From equations (3)-(4) it is clear that the scores $S_i$ are highly dependent on the baselines. The baselines therefore determine how easy or difficult it is to reach a certain score during a biofeedback training session. The main issues when determining baselines are; how should they adapt to the user 50 and how to initialize them.

At first, the baselines are initialized by the therapist 38 to plausible physiological values that ensures that every user 50 using the device for the first time get a score in the middle range $S_i \in (30, 70)$. These thresholds are determined heuristically based on the physiological parameter being measured. For example, $B_{HR,low}=25$ bpm, $B_{HR,high}=110$ bpm. During the first few sessions, these upper and lower thresholds gradually close in around a baseline value. After X sessions, the user 50 will have exhibited a set of physiological measurements that can be classified as $y_{i,best}$ (the definition of best can be varied, and is application dependent). For example, the median value of the 30 lowest heart rate measurements during the X first sessions.

With the above mentioned definition of $y_{i,best}$ a naive iterative baseline update scheme which depends on whether equation (3) or (4) is used for score computation can be defined.

Case 1—When using equation (3) $B_{i,low}$ is kept fixed and $B_{i,high}$ is adapted according to:

$$B_{i,high} = (1+\kappa) \cdot y_{i,best} \quad (10)$$

where $\kappa > 0$ determines how aggressively $B_{i,high}$ moves.

Case 2—When using equation (4) $B_{i,high}$ is kept fixed and $B_{i,low}$ is adapted according to:

$$B_{i,low} = (1-\kappa) \cdot y_{i,best} \quad (11)$$

where $\kappa > 0$ determines how aggressively $B_{i,low}$ moves.

It will be appreciated that the above calculations can be implemented for multiple sessions with the biofeedback system being provided with the ability to learn from prior sessions, as well as to record and assess data relating to the patient's performance, symptoms, medication and so on as discussed above. In this way the biofeedback system can be provided with means to operate as an enhanced form of "headache diary", along with basic prediction/forecasting abilities based on identifying patterns in the patient's behaviour that may link to increasing or decreasing likelihood of a headache or migraine.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A biofeedback training system for headache patients, the system comprising:
a sensor system for obtaining and transmitting data indicative of a plurality of physiological parameters of a patient, the sensor system being configured for measurement of the physiological parameters of the patient, wherein the physiological parameters include at least two of muscle tension, body temperature, heart rate, and heart rate variability;
a personal computing device arranged to receive data from the sensor system and to interact with the patient via a user interface of the personal computing device; and
a computer-implemented biofeedback training agent;
wherein the personal computing device together with the biofeedback training agent are configured to provide real-time feedback to the patient, as the patient attempts to control their physiological state during a biofeedback training session, by carrying out the following steps:

obtain data indicative of the physiological parameters from the sensor system;
instruct the patient to control the physiological parameters;
determine baseline levels for each of the physiological parameters;
derive a continually-updating score for each of the physiological parameters relative to the baseline levels, wherein the continually updating score increases in reaction to control of the respective physiological parameter toward a respective target one of the baseline levels;
assess a respective degree of success of the patient in controlling each physiological parameter based on the scores, wherein the degree of success of the patient in controlling each physiological parameter is ranked from a highest success to a lowest success based on a ranking of scores from a highest score to a lowest score;
use a weighting system to determine a weighting for the score associated with each of the physiological parameters, wherein the weighting system gives a higher weighting to the score for the physiological parameter that the patient most successfully controls and a lower weighting to the score for the physiological parameter that the patient least successfully controls;
determine a continually-updating total score consisting of a combination of the weighted scores;
present the continually-updating total score to the patient, via the user interface, as a personalized total score for the patient to use to control their physiological state by trying to increase the personalized total score during the biofeedback training session.

2. The biofeedback training system of claim 1, wherein the plurality of physiological parameters comprises at least three physiological parameters, with scores being derived for each of at least three physiological parameters, with the weighting system determining a higher weighting for the most successful of the at least three physiological parameters and a lower weighting for the least successful of the at least three physiological parameters and wherein the sensor system takes measurements of all three of muscle tension, body temperature and heart rate.

3. The biofeedback training system of claim 1, wherein the biofeedback training agent is arranged to determine baseline levels for the physiological parameters, wherein these baseline levels include a low baseline level and a high baseline level, with the range between the low baseline level and the high baseline level being a range that encloses normal values of the physiological parameters.

4. The biofeedback training system of claim 3, wherein, for each of the physiological parameters, one of the baseline levels defines a target value, which is a value of the physiological parameter toward which the patient is instructed to control their body; and the other of the baseline levels that is not the target value defines an outer bound for normal variation of the physiological parameter.

5. The biofeedback training system of claim 4, wherein the biofeedback training agent is arranged to determine the score for each physiological parameter using the size of the range between the baseline levels for that physiological parameter along with the degree of success of the patient in controlling the physiological parameter toward the target value.

6. The biofeedback training system of claim 4, wherein the score for each physiological parameter is calculated based on proximity of the current value for the physiological parameter to the respective target value, with the other of the low or high baseline levels being used to normalise the score to allow the difference to the target value to be presented as a decimal or percentage value.

7. The biofeedback training system of claim 1, wherein the biofeedback training agent is configured to set initial baseline levels for a new patient based on ranges for the physiological parameters that are expected to capture normal values for all patients.

8. The biofeedback training system of claim 1, wherein the determination of the baseline levels is done adaptively with changes to the baseline levels taking account of at least one of the patient's past performance and the patient's on-going performance during a biofeedback session.

9. The biofeedback training system of claim 7, wherein the baseline levels are adjusted compared to the initial baseline levels in order: to reduce the size of the range between the high and low baselines; and/or to move a target value toward an expected achievable value for the patient; and/or to make a target value more difficult to achieve as the patient becomes more successful at controlling the physiological parameter.

10. The biofeedback training system of claim 8, wherein a target value is adjusted based on a best value achieved by the patient for the relevant physiological parameter, with the best being defined as that which is closest to the target value.

11. The biofeedback training system of claim 1, wherein the weighting for the score for each physiological parameter is a multiplier for the score, and the higher and lower weightings that are used to reflect the more and less successful control of physiological parameters are implemented by addition of a constant to the weighting multiplier for the physiological parameter with the highest score, and subtraction of a constant from the weighting multiplier for the physiological parameter with the lowest score.

12. The biofeedback training system of claim 1, wherein the weightings are adjusted periodically based on a prescribed time period and/or when changes in the scores indicates a change in the ranking of the physiological parameters by the patient's success.

13. The biofeedback training system of claim 1, wherein the biofeedback training agent is configured to request and record patient data in connection with the patient's usage of other medication or therapy and/or the patient's symptoms, with the latter including one or more of: the incidence of migraine/headache; headache parameters; headache frequency; and premonitory symptoms.

14. The biofeedback training system of claim 13, wherein the biofeedback training agent is configured to provide guidance to the patient to prompt behavioural changes to reduce the risk of a future migraine or to reduce the risk of another form or headache, and wherein the guidance to the patient takes the form of a selection of a particular physiological parameter as the focus for biofeedback.

15. The biofeedback training system of claim 13, wherein the biofeedback training agent comprises a cost function that is optimised taking account of performance criteria including symptoms and/or the incidence of migraine or other headache, with the cost function taking account of the success of the patient in particular sessions with reference to headache/migraine reduction and/or success of the patient in relation to particular individual physiological parameters.

16. The biofeedback training system of claim 15, wherein the biofeedback training agent is configured to take a measure of the engagement of the patient and to react to this by adjusting the weighting and/or by incorporating the measure of engagement into the cost function.

17. The biofeedback training system of claim 16, wherein the biofeedback training system comprises a user engagement sensor for determining if the patient is attentive or not, and wherein a camera of the personal computing device acts as the user engagement sensor, with the camera being used to provide images for facial recognition and/or eye-tracking.

18. A method for operating a biofeedback training system for headache patients, the biofeedback training system comprising: a sensor system; a personal computing device; and a computer-implemented biofeedback training agent;
   wherein the method comprises providing real-time feedback to a patient, as the patient attempts to control their physiological state during a biofeedback training session, by:
   using the sensor system for obtaining and transmitting data indicative of a plurality of physiological parameters of the patient, wherein the physiological parameters include at least two of muscle tension, body temperature, heart rate and heart rate variability;
   using the personal computing device, receiving data from the sensor system; and
   using the personal computing device together with the biofeedback training agent to carry out the following steps:
   obtain data indicative of the physiological parameters from the sensor system;
   instruct the patient to control the physiological parameters;
   determine baseline levels for each of the physiological parameters;
   derive a continually-updating score for each of the physiological parameters relative to the baseline levels, wherein the continually-updating score increases in reaction to control of the respective physiological parameter; and
   assess a respective degree of success of the patient in controlling each physiological parameter based on the scores, wherein the degree of success of the patient in controlling each physiological parameter is ranked from a highest success to a lowest success based on a ranking of scores from a highest score to a lowest score;
   use a weighting system to determine a weighting for the score associated with each of the physiological parameters, wherein the weighting system gives a higher weighting to the score for the physiological parameter that the patient most successfully controls and a lower weighting to the score for the physiological parameter that the patient least successfully controls;
   determine a continually-updating total score consisting of a combination of the weighted scores;
   present the continually-updating total score to the patient, via a user interface, as a personalized total score for the patient to use to control their physiological state by trying to increase the personalized total score during the biofeedback training session.

19. A non-transitory computer-readable medium carrying a computer program for a biofeedback training system comprising a sensor system and a personal computing device, the computer program comprising instructions that, when executed, will provide the biofeedback training system with a biofeedback training agent and configure the biofeedback training system such that it will provide real-time feedback to a patient, as the patient attempts to control their physiological state during a biofeedback training session, by:
   using the personal computing device, receiving data from the sensor system; and using the personal computing device together with the biofeedback training agent, carrying out the following steps:

obtain data indicative of a plurality of physiological parameters of the patient from the sensor system, wherein the physiological parameters include at least two of muscle tension, body temperature, heart rate, and heart rate variability;

instruct the patient to control the physiological parameters;

determine baseline levels for each of the physiological parameters;

derive a continually-updating score for each of the physiological parameters relative to the baseline levels, wherein the continually-updating score increases in reaction to control of the respective physiological parameter; and assess a respective degree of success of the patient in controlling each physiological parameter based on the scores, wherein the degree of success of the patient in controlling each physiological parameter is ranked from a highest success to a lowest success based on a ranking of scores from a highest score to a lowest score;

use a weighting system to determine a weighting for the score associated with each of the physiological parameters, wherein the weighting system gives a higher weighting to the score for the physiological parameter that the patient most successfully controls and a lower weighting to the score for the physiological parameter that the patient least successfully controls;

determine a continually-updating total score consisting of a combination of the weighted scores;

present the continually-updating total score to the patient, via a user interface, as a personalized total score for the patient to use to control their physiological state by trying to increase the personalized total score during the biofeedback training session.

20. The biofeedback training system of claim 1, wherein the personal computing device together with the biofeedback training agent are configured to select a particular physiological parameter to be a focus for biofeedback, as the patient attempts to control their physiological state during the biofeedback training session.

* * * * *